Patented June 10, 1952

2,600,321

UNITED STATES PATENT OFFICE 2,600,321

SELF-LUBRICATED PLASTICS

James J. Pyle, Coshocton, Ohio, assignor to General Electric Company, a corporation of New York No Drawing. Application December 29, 1949, Serial No. 135,825

1 Claim. (Cl. 260—38)

This invention relates to improved self-lubricated plastics materials. More particularly, it relates to plastics having incorporated therein in an improved manner a solid lubricant such as molybdenum sulfide.

It is known that certain solid materials such as molybdenum sulfide have desirable lubricating properties. It has also been known heretofore to incorporate such materials as fillers in plastics or resins. In using the powdered lubricant as a filler, it is added to the resin or resin mixture along with other fillers and the whole compounded as between rolls and ground for later use in molding and the like. It has been found, however, that when the solid lubricant is added as above described with the fillers and compounded, the lubricating qualities of the cured plastics material are very poor. It is believed that such poor lubricant characteristics are due to a coating of resin around each lubricant particle which must be worn away before the lubricant is available to perform its function. During the compounding process the particles of solid lubricant are coated with a layer of resinous powder. Upon later being cured, the resin coating forms a solid shell or barrier around the particles. The net result is that when the molded part is used as a bearing or is in contact with a moving member, there is little or no lubricating action and the parts tend to bind and wear excessively. In order for any lubricating qualities to be realized at all, it is necessary that the resin shell about each lubricating particle be abraded or worn away to expose the lubricant itself. This process must be repeated for each individual particle for initial lubrication. Then, as the lubricant is worn away from the bearing surface, more lubricant particles must be exposed to renew the lubrication. The final result of compounding the lubricant with the resin or resin-filler mixture is excessive binding and friction due to the poor availability of the solid lubricant particles for actual lubricating.

An object of this invention is to provide self-lubricating plastics having improved lubricating qualities.

Another object of the present invention is to provide self-lubricating plastics materials in which the lubricant is immediately and continuously available at the bearing surface.

A further object of the invention is to provide a method of manufacturing such improved self-lubricating plastics.

Other objects will become apparent and the invention better understood from a consideration of the following description.

It has been found that self-lubricating plastics with improved lubricating qualities may be made by first compounding the resin or resin-filler mixture and then blending the solid lubricant such as molybdenum sulfide into the previously compounded mixture. Other materials similar to molybdenum sulfide which may be interchangeably used in the present connection are molybdenum telluride and selenide as well as the sulfides, tellurides and selenides of such metals as zirconium, titanium and tungsten.

It has further been found that self-lubricating plastics made by blending in the lubricant after compounding rather than before or during compounding provide lubricating particles within the plastics material which are immediately available for lubricating purposes. While the particles are bonded by resinous or resin-filler mixtures they are discrete and not surrounded by an enclosing shell of resin as when the lubricant is compounded in. As a result, there are available in the surface of the plastics free and unhindered particles of lubricant to form a lubricating film. As the film is worn away and the surface particles are exhausted, underlying particles become available. Since the particles are uncoated, the lubricating process is immediate and continuous and devoid of chattering, binding and excessive abrasion which occur when the particles are resin coated.

Any plastics molding material may be used in the practice of the present invention. Neither is there any limitation as to the fillers which may be employed in conjunction with the invention. The lubricant itself may be present in any amount, the lower limit being that at which the lubrication becomes deficient. The upper limit is that at which the plastics structure is too weakened by the presence of the lubricating material or the point at which too much lubricant is freed from the plastics. In general the same amount of lubricant may be used as has been heretofore when the lubricant was compounded in with the resin mixture rather than later blended in as herein described. Lubricant additions in amounts from about three to fifteen percent have been found very effective.

The following is given as an example of the practice of the present invention, it being understood that the process may be applied to any molding plastics, filled or unfilled, which it is desired to make self-lubricating:

Example

| | Parts by weight |
|---|---|
| Phenol-formaldehyde resin | 53.2 |
| Walnut shell flour | 8.33 |
| Wood flour | 25.0 |
| Asbestos fibers (fine) | 5.83 |
| Nigrosine dye | 1.67 |
| Candelilla wax | 0.833 |

The above resinuous material filler and dye were compounded by rolling on differential rolls and ground to powder form in which the plastic material and filler were intimately dispersed. A Banbury mixer may also be used. About five percent by weight, based on the above materials, of powdered molybdenum sulfide was blended into the compounded and ground resin mix by any of the conventional methods of mixing powders. Bearings are formed from this ultimate molding composition.

Self-lubricating plastics made according to the teaching of this invention may be used in any application wherein a bearing surface is desired and fabrication with plastics material is indicated.

What I claim as new and desire to secure by Letters Patent of the United States is:

The process of making a self-lubricating molded body for bearing use which comprises mixing a resinous molding material and an inert filler to produce a powdered composition in which said plastic material and filler are intimately dispersed throughout, thereupon blending about 3 to 15 per cent by weight of powdered molybdenum sulfide with said powdered composition and molding the resulting blend into a body of desired configuration, said sulfide being continuously available for lubricating purposes as discrete particles uncoated by resin at a bearing surface of said body.

JAMES J. PYLE.

REFERENCES CITED

The following references are of record in the file of this patent:

UNITED STATES PATENTS

| Number | Name | Date |
|---|---|---|
| 1,054,265 | Baekland | Feb. 25, 1913 |
| 2,280,886 | Brace | Apr. 28, 1942 |